(No Model.)

3 Sheets—Sheet 1.

R. F. BRIDEWELL.
PROPULSION OF STREET CARS.

No. 260,648.                     Patented July 4, 1882.

Witnesses.
Wm. W. Mortimer
W. H. Kern

Inventor:
R. F. Bridewell,
per
F. A. Lehmann,
Atty.

(No Model.)
R. F. BRIDEWELL.
PROPULSION OF STREET CARS.
No. 260,648. Patented July 4, 1882.
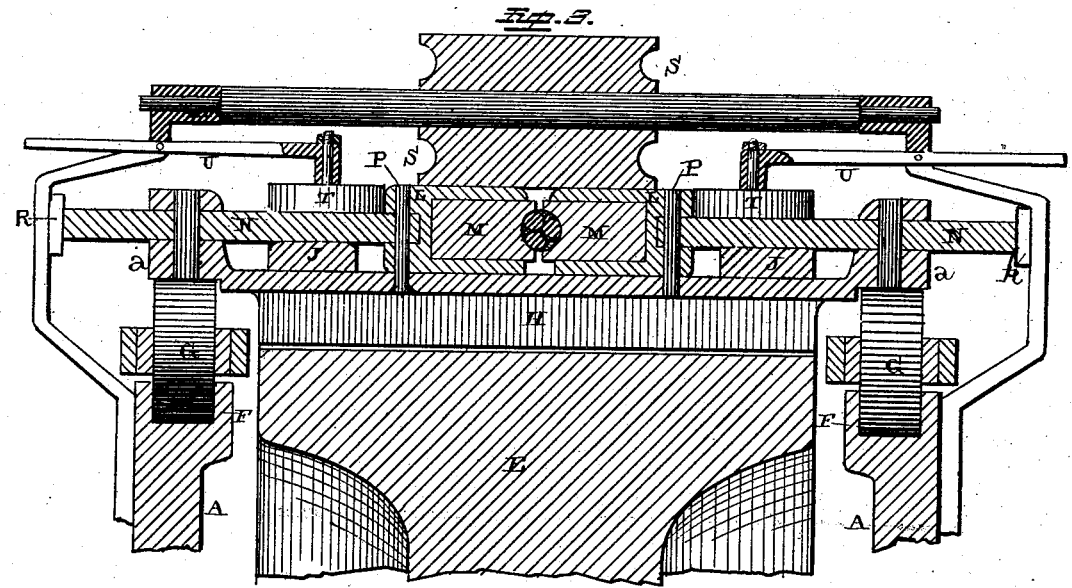
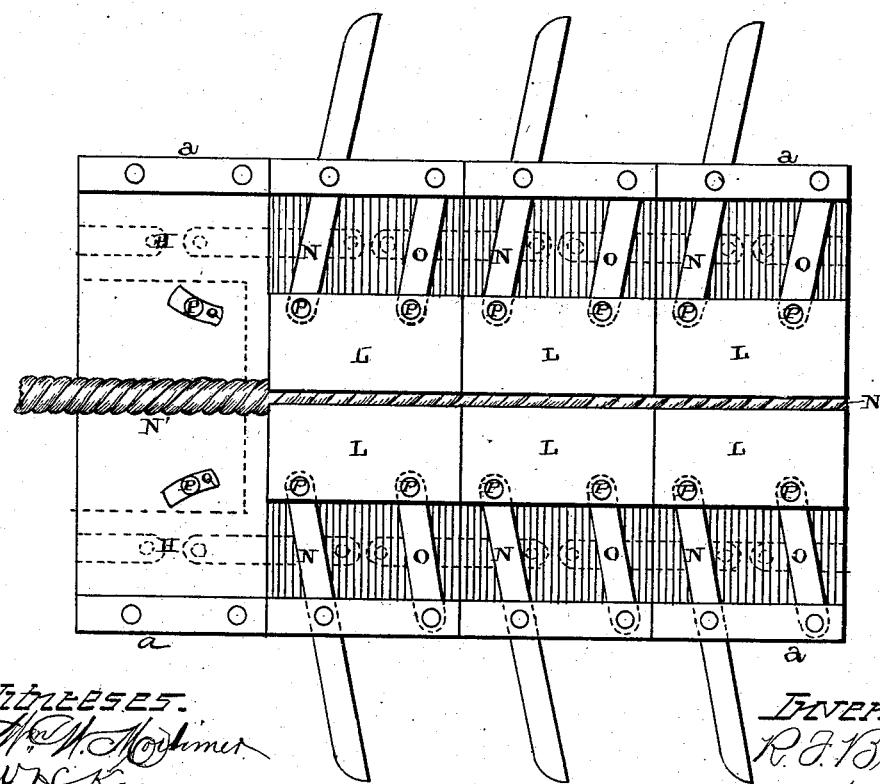

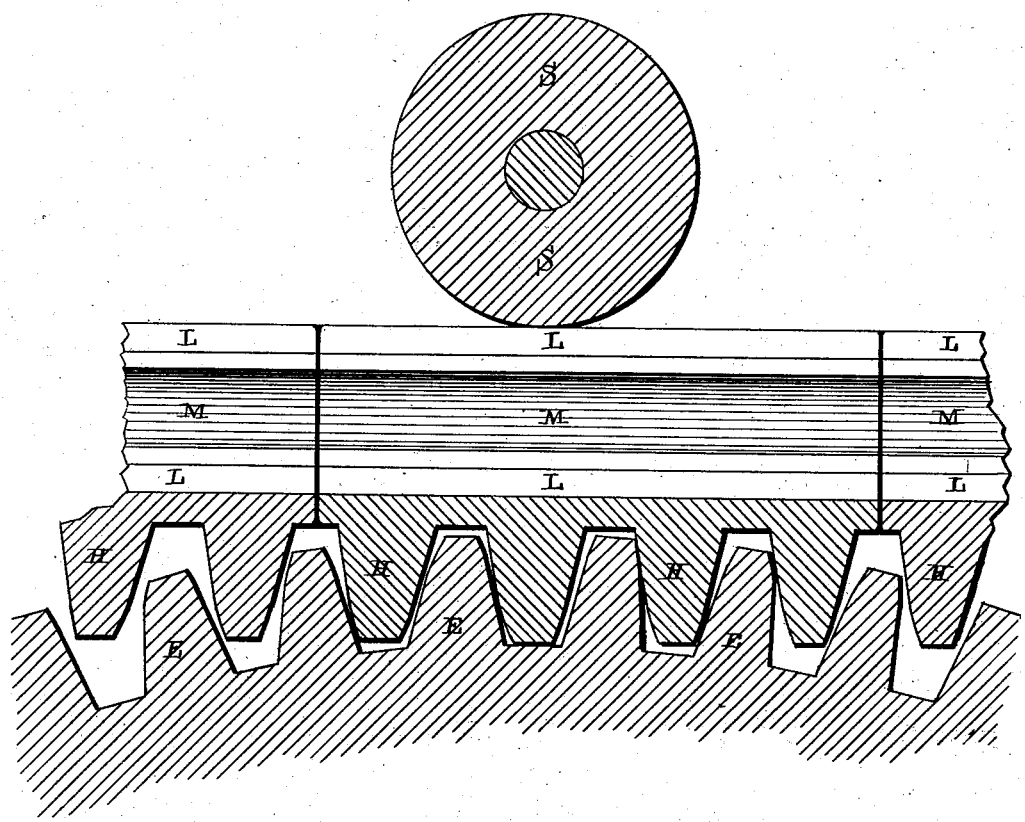

UNITED STATES PATENT OFFICE.

RICHARD F. BRIDEWELL, OF SAN FRANCISCO, CALIFORNIA.

PROPULSION OF STREET-CARS.

SPECIFICATION forming part of Letters Patent No. 260,648, dated July 4, 1882.

Application filed January 30, 1882. (No model.)

*To all whom it may concern:*

Be it known that I, RICHARD F. BRIDEWELL, of San Francisco, in the county of San Francisco and State of California, have invented certain new and useful Improvements in the Propulsion of Street-Cars; and I do hereby declare the following to be a full, clear, and exact description of the invention, such as will enable others skilled in the art to which it pertains to make and use it, reference being had to the accompanying drawings, which form part of this specification.

My invention relates to an improvement in the propulsion of street-cars; and it consists in the combination of an oblong frame having curved ends, suitable driving-wheels, and two series of friction-rollers, upon which the endless bed-piece moves, carrying the clamping-jaws for catching hold of the cable.

It further consists in the clamping-jaws having suitable material secured to their inner edges for catching against the cable, in combination with suitable pivoted rods attached to each jaw, rollers to close the jaws on the cable, and projections for the rods to strike against to open the jaws and release the cable, all of which will be more fully described hereinafter.

The object of my invention is to place the engine as near as possible midway between the two extreme ends of the road, and to so construct the driving-engine as to dispense with the necessity of having to wrap the cable around the driving-drum, and thus dispense with breaking and kinking the cable, as is always the case where the cable is wrapped around a drum a large number of times for the purpose of preventing it from slipping.

Figure 1:
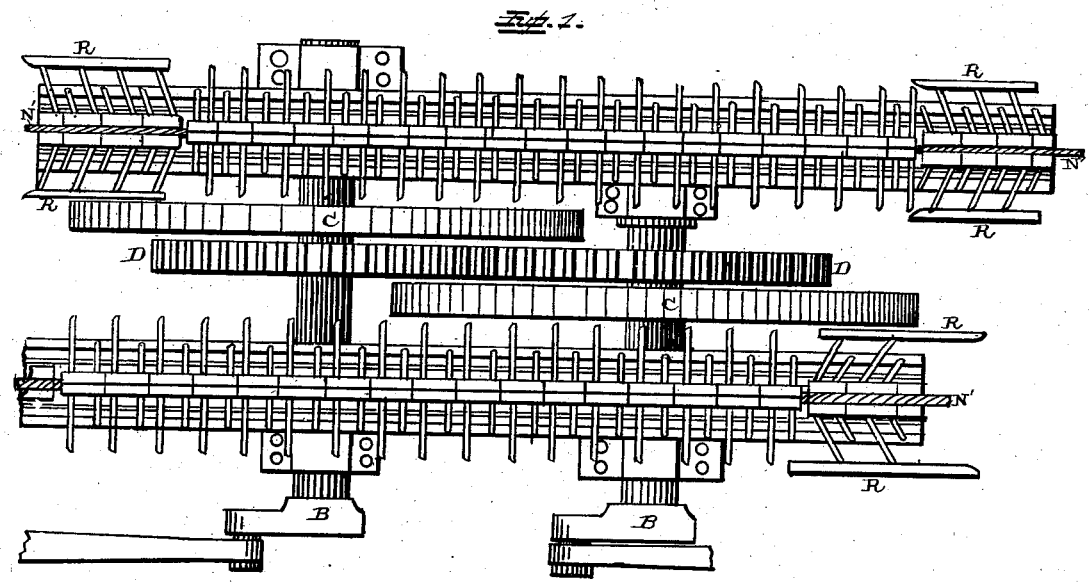
Figure 2:
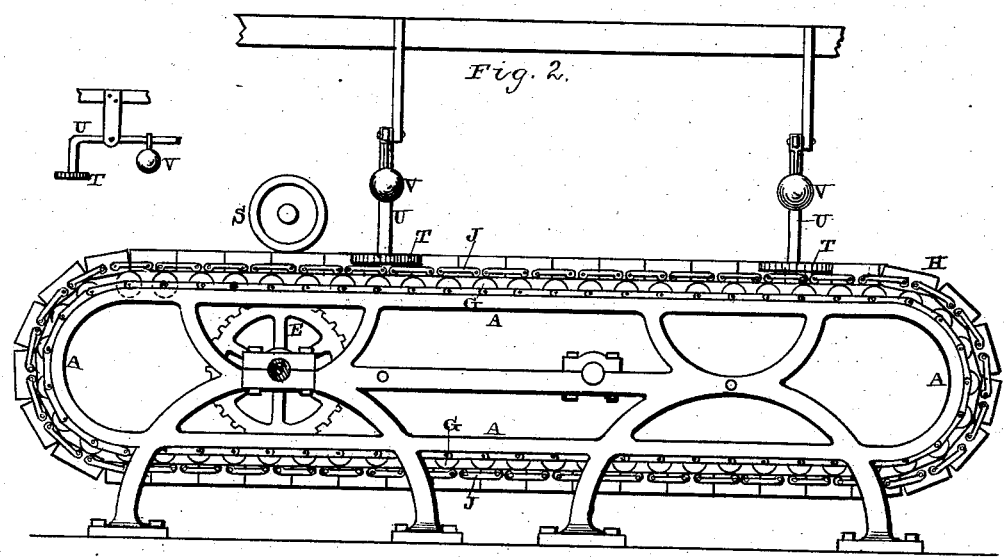

Figure 1 is a plan view of the engine which will preferably be used. Fig. 2 is a side elevation of the frame and the endless chain of clamping-blocks for catching hold of the cable. Fig. 3 is a vertical section of the same. Fig. 4 is a plan view. Fig. 5 is a vertical longitudinal section taken through the center of Fig. 3.

In building the engine-house I prefer to locate it as near as possible midway between the two extreme ends of the road, so that as even and continuous a strain as possible shall be kept upon the cable. This engine-house will be excavated from under the center of the street, and then the street arched over, leaving nothing but a slot through the roof for the grip which is to be used for connecting the car to the endless cable. At each end of the road there will be a large pulley used for the cable to pass around, and thus avoid as much as possible giving the cable a short bend or curve or kinking it in any manner.

Heretofore the cable has been wrapped a large number of times around the driving-drum, so as to prevent it from slipping, and this wrapping of the cable around the drum kinks and damages the cable to a very great extent. In order to overcome this great defect I propose to operate the cable by having it seized between endless traveling jaws and forced or drawn along by frictional contact alone without bending the cable in the slightest.

A represents a suitable oblong frame, having rounded ends, as shown. This frame is so constructed that the different shafts belonging to the propelling-engine can be journaled in it. This engine consists of two cranked driving-shafts, B, each one of which is provided with a fly-wheel, C, a large toothed wheel, D, for transferring the motion of one shaft to the other, and a toothed driving-wheel, E. Passed around the frame A, which is provided with suitable grooved guiding-slots, F, upon each edge, are the two series of endless friction-rollers G. These rollers are connected together by links in the usual manner, and form the support for the endless moving bed H, which is composed of a series of blocks of any desired length, each one of which is provided with a series of teeth or cogs on its under side, so as to mesh with the driving-wheels E, and thus be made to travel constantly around the oblong frame A.

Each one of the blocks of this endless bed H has a projection or flange, *a*, formed upon each side, and these flanges or projections extend over the tops of the friction-rollers G and serve as supports for the blocks. These blocks are connected together by straps or hinges J in the same manner as the friction-rollers G, and these straps are applied to their sides, as shown in Fig. 2.

Upon the top of each block are placed the two clamping-jaws L, in between which the cable N' is clamped and drawn along by frictional contact as the endless bed H is moved along by the driving-wheel E. These blocks L are made hollow upon their inner sides, and are provided with fillings of rubber, wood, soft metal, or any other suitable substance, M, which will catch hold of the cable without injuring it. These blocks L are held down upon the blocks H, which form the endless bed, by means of the bolts P, which pass down through the blocks L and levers N, and which have their lower ends to pass down through the slots Q made in the blocks H. These bolts P may have a sufficient head formed on them to prevent their being easily pulled out, and the lower end of the bolt will have a slight play in the slot Q, for the purpose of allowing the blocks L to close upon the cable N', for the purpose of clamping it with sufficient force to draw it along as the endless bed is moved around the frame, and for the purpose of allowing the blocks to open outward sufficiently far to release the cable from between them. There may be only a single bolt, P, having its lower end to pass down into the slots in the block, or there may be two of these bolts for each block L, as may be preferred.

To the outer edge of each one of these blocks L are pivoted by means of the bolts P the two levers N O, which serve to guide the blocks in opening and closing upon the cable. The levers N are made considerably longer than the levers O, for the purpose of extending beyond the sides of the frame, so as to strike against the cams or other devices R, which are placed at each end of each one of the frames A. These levers, striking against these cams or projections, cause the blocks L to open sufficiently far to allow the cable to pass freely between them, and then, after the blocks have traveled to the other end of the frame, they strike the second set of cams or projections and cause the blocks to open, so as to release the cable before the blocks begin to pass down around the end of the frame. The levers N are pivoted near their centers and the levers O at their outer ends upon the top of the flange A, as shown in Figs. 3 and 4.

In order to hold the endless bed of blocks H down in contact with the driving-wheel E, the roller S is used, and this roller may be journaled as is shown in Fig. 3, or in any other manner that may be preferred. Where this roller is used no sudden jerks or strains upon the cable can raise the blocks H up out of contact with the driving-wheel, and hence the cable will be always drawn evenly along under any circumstances.

In order to keep the blocks in close contact with the cable after they have been once closed upon it, the rollers T are used. These rollers are journaled in the inner ends of the pivoted weighted levers U, which levers can have the weights V adjustably arranged to operate upon their outer ends in such a manner as to press the blocks together with any desired degree of force. These levers T are arranged in pairs and placed upon opposite sides of the blocks, and there may be any desired number of them. These pivoted weighted levers may be arranged in the same frame as the large roller is pivoted in, or they may be suspended from the top of the engine-house.

Two of the frames A are arranged side by side, as shown in Fig. 1, and the blocks L are moved around each one of the frames at the same time, so as to draw up the cable upon one line and draw down the other. This arrangement of parts insures a steady and even strain upon the cable from one end to the other, and will keep the cable always moving smoothly along.

Having thus described my invention, I claim—

1. The combination of the endless cable with an endless set of clamping-jaws which are made to clamp upon the cable and draw the cable along with them, and a suitable mechanism for closing the jaws on the cable, and then opening them before the jaws reach the end of the bed, substantially as shown.

2. The combination of a driving-wheel, an endless bed composed of a series of toothed blocks which are connected together, suitable friction-rollers for supporting the blocks, and clamping-jaws which are made to automatically catch hold of and release themselves from the cable, substantially as described.

3. The combination of the clamping-jaws, the brace-rods N O, and tripping devices R, whereby the jaws are opened so as to release the cable, substantially as set forth.

4. The combination of an endless movable bed, carrying suitable clamping-jaws, which are movable upon the bed, the rods N O, which are attached to the jaws, and the wheels P, for closing the jaws upon the cable, substantially as specified.

In testimony whereof I affix my signature in presence of two witnesses.

RICHARD F. BRIDEWELL.

Witnesses:
JOHN WHITE,
JOHN E. HAMILL.